(12) United States Patent
Kren et al.

(10) Patent No.: US 9,081,727 B2
(45) Date of Patent: Jul. 14, 2015

(54) METHOD, APPARATUS AND COMPUTER PROGRAM FOR LOADING FILES DURING A BOOT-UP PROCESS

(75) Inventors: David Kren, London (GB); Peter Hartman, London (GB); Ian Wood, London (GB)

(73) Assignee: Nokia Technologies Oy, Espoo (FI)

( * ) Notice: Subject to any disclaimer, the term of this patent is extended or adjusted under 35 U.S.C. 154(b) by 617 days.

(21) Appl. No.: 13/378,355

(22) PCT Filed: May 25, 2010

(86) PCT No.: PCT/IB2010/052321
§ 371 (c)(1),
(2), (4) Date: Mar. 22, 2012

(87) PCT Pub. No.: WO2011/001305
PCT Pub. Date: Jan. 6, 2011

(65) Prior Publication Data
US 2012/0185686 A1   Jul. 19, 2012

(30) Foreign Application Priority Data
Jun. 30, 2009  (GB) .................... 0911337.4

(51) Int. Cl.
*G06F 11/00* (2006.01)
*G06F 11/14* (2006.01)
(52) U.S. Cl.
CPC .......... *G06F 11/1417* (2013.01); *G06F 11/143* (2013.01); *G06F 11/1433* (2013.01)
(58) Field of Classification Search
CPC ............ G06F 11/0778; G06F 11/0793; G06F 11/0712; G06F 11/1417; G06F 11/1471; G06F 11/0787; G06F 9/4401; G06F 21/575; G06F 8/61; G06F 9/44505; G06F 11/079; G06F 11/3055; G06F 11/3476; G06F 17/30584
USPC .................................................. 714/36; 713/2
See application file for complete search history.

(56) References Cited

U.S. PATENT DOCUMENTS 5,974,546 A * 10/1999 Anderson .......................... 713/2
6,189,147 B1 * 2/2001 Davis ............................. 717/175
(Continued)

FOREIGN PATENT DOCUMENTS

EP         1001339 A2    5/2000
WO       02/073379 A2    9/2002

OTHER PUBLICATIONS

Office Action received for corresponding Korean Patent Application No. 2012-7002401, dated Sep. 25, 2013, 7 pages.
(Continued)

*Primary Examiner* — Bryce Bonzo
*Assistant Examiner* — Elmira Mehrmanesh
(74) *Attorney, Agent, or Firm* — Alston & Bird LLP

(57) ABSTRACT

A method, apparatus and computer program are provided for loading files during a boot-up process. In the context of a method, the method includes identifying at least one new file to be loaded in a computing device during a boot-up process of said computing device. Also, determining if loading at least one of the identified new file(s) causes the computing device to crash. Also, updating a list on the computing device in dependence on whether the loading of the identified new file(s) causes the computing device to crash. Also, loading at least one file in the computing device during a boot-up process in dependence on the list, to prevent the computing device crashing during the boot-up process.

18 Claims, 10 Drawing Sheets

(56) References Cited

U.S. PATENT DOCUMENTS

| | | | |
|---|---|---|---|
| 6,230,285 B1* | 5/2001 | Sadowsky et al. | 714/14 |
| 6,675,295 B1 | 1/2004 | Marcelais et al. | |
| 6,898,731 B2* | 5/2005 | Hack et al. | 714/10 |
| 7,734,945 B1* | 6/2010 | Levidow et al. | 714/3 |
| 8,438,423 B1* | 5/2013 | Barkelew | 714/36 |
| 8,453,015 B2* | 5/2013 | Ponnuswamy | 714/38.11 |
| 2003/0131279 A1 | 7/2003 | Hack et al. | |
| 2008/0276239 A1* | 11/2008 | Collins et al. | 718/101 |

OTHER PUBLICATIONS

International Search Report and Written Opinion received for corresponding Patent Cooperation Treaty Application No. PCT/IB2010/052321, dated Oct. 29, 2010, 15 pages.

International Preliminary Report on Patentability received for corresponding Patent Cooperation Treaty Application No. PCT/IB2010/052321, dated Jan. 4, 2012, 12 pages.

Search Report received for corresponding United Kingdom Patent Application No. 0911337.4, dated Oct. 16, 2009, 3 pages.

Office Action received for corresponding Chinese Application No. 201080026332.2, dated Nov. 5, 2013, 14 pages.

Extended European Search Report from corresponding European Application No. 10 793 706.2, dated Oct. 19, 2012.

Office Action from corresponding Chinese Patent Application No. 201080026322.3, dated Aug. 5, 2014.

Office Action for Chinese Application No. 201080026322.3 dated Jan. 29, 2015.

* cited by examiner

METHOD, APPARATUS AND COMPUTER PROGRAM FOR LOADING FILES DURING A BOOT-UP PROCESS

RELATED APPLICATION

This application was originally filed as PCT Application No. PCT/IB2010/052321 filed May 25, 2010, which claims priority benefit to Great Britain Patent Application No. 0911337.4, filed Jun. 30, 2009.

TECHNICAL FIELD

Embodiments of the present invention relate generally to computing devices. More particularly, embodiments relate to a method, apparatus and computer program for loading files during a boot-up process of said computing devices.

BACKGROUND

When a computing device is switched on or after it has been rebooted, the computing device performs a boot-up process to initialise the device. The boot-up process involves the loading of a number of files. In the event one of the files is corrupt the computing device may crash when trying to load the corrupt file and consequently need to reboot. However, the corrupt file can lead to a continuous reboot cycle, wherein the device never completes the boot-up process.

SUMMARY OF EMBODIMENTS

Various aspects of examples of the invention are set out in the claims.

A first example of the invention provides a method, comprising:

identifying at least one new file to be loaded in a computing device during a boot-up process of said computing device, determining if loading at least one of the identified new file(s) causes said computing device to crash, and updating a list on said computing device in dependence on whether the loading of the identified new file(s) causes said computing device to crash; and, loading at least one file in said computing device during a boot-up process of said computing device in dependence on said list to prevent said computing device crashing during the boot-up process.

In an example, determining if loading at least one of the identified new file(s) causes said computing device to crash comprises loading the identified new file(s) and detecting if said computing device has not crashed. In another example, detecting that said computing device has not crashed comprises detecting that said computing device is operational.

In an example, determining if loading at least one of the identified new file(s) causes said computing device to crash further comprises performing a verification test on the identified new file(s) before the identified new file(s) is/are loaded. In another example, it is determined that loading an identified new file causes said computing device to crash if the identified new file fails the verification test. In a further example, the verification test comprises determining that the size of the identified new file is greater than zero.

In an example, said list comprises an invalid portion, and a representation of an identified new file is stored in said invalid portion if it is determined that loading the identified new file causes said computing device to crash. In another example, said list further comprises a valid portion, and a representation of an identified new file is stored in said valid portion if it is determined that loading the identified new file does not cause said computing device to crash. In another example, step a. further comprises writing a representation of at least one of the identified new file(s) in said invalid portion, and updating said list comprises moving a representation to said valid portion if loading the identified new file corresponding to the representation is determined not to cause said computing device to crash. In a further example, each representation written in said invalid portion is tagged, and updating said list further comprises de-tagging a representation in said invalid portion if loading the identified new file corresponding to the representation is determined to cause said computing device to crash.

In an example, step b. comprises not loading files having a representation in said invalid portion. In another example, step b. comprises loading files having a representation in said valid portion.

In an example, the method further comprises detecting a modification to a file having a representation in said list, and removing said representation from said list.

In an example, identifying at least one new file to be loaded in the computing device during a boot-up process of said computing device comprises identifying files to be loaded during the boot-up process which do not have a representation in said list. In another example, identifying at least one new file to be loaded in the computing device during a boot-up process of said computing device further comprises identifying files corresponding to one or more representation(s) received from the computing device which do not have a representation in said list.

A second example of the invention provides an apparatus, comprising:

a processor memory including computer program code the memory and computer program code configured in use to, with the processor, cause the apparatus to perform at least the following:

identify any new files to be loaded in a computing device during a boot-up process of said computing device, determining if loading at least one of the identified new file(s) causes said computing device to crash, and updating a list on said computing device in dependence on whether the loading of the identified new file(s) causes said computing device to crash; and, load at least one file in said computing device during a boot-up process of said computing device in dependence on said list to prevent said computing device crashing during the boot-up process.

A third example of the invention provides a computer program, comprising: code for identifying at least one new file to be loaded in a computing device during a boot-up process of said computing device, determining if loading at least one of the identified new file(s) causes said computing device to crash, and updating a list on said computing device in dependence on whether the loading of the identified new file(s) causes said computing device to crash; and, code for loading at least one file in said computing device during a boot-up process of said computing device in dependence on said list to prevent said computing device crashing during the boot-up process.

In an example, the computer program is a computer program product comprising a computer-readable medium bearing a computer program code embodied therein for use with a computer.

A fourth example of the invention provides a computer-readable medium encoded with instructions that, when executed by a computer:

identify any new files to be loaded in a computing device during a boot-up process of said computing device, determining if loading at least one of the identified new file(s) causes said computing device to crash, and updating a list on said computing device in dependence on whether the loading of the identified new file(s) causes said computing device to crash; and, load at least one file in said computing device during a boot-up process of said computing device in dependence on said list to prevent said computing device crashing during the boot-up process.

A fifth example of the invention provides an apparatus, comprising:

means for identifying at least one new file to be loaded in a computing device during a boot-up process of said computing device, said means being configured to determine if loading at least one of the identified new file(s) causes said computing device to crash, and said means being configured to update a list on said computing device in dependence on whether the loading of the identified new file(s) causes said computing device to crash; and, means for loading at least one file in said computing device during a boot-up process of said computing device in dependence on said list to prevent said computing device crashing during the boot-up process.

BRIEF DESCRIPTION OF THE DRAWINGS

Embodiments are hereinafter described with reference to the accompanying diagrams where.

DESCRIPTION OF EMBODIMENTS

A description of a number of embodiments follows, provided by way of example only.

Figure 1:
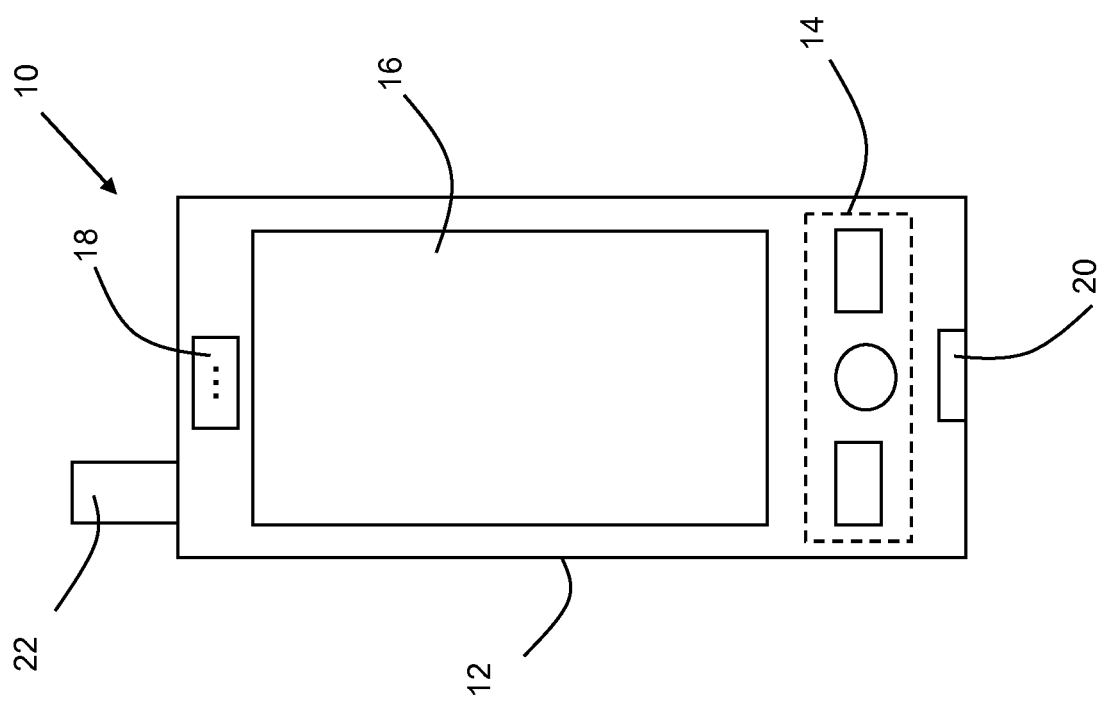
FIG. 1 is a schematic representation of a computing device in which an embodiment of the invention is implemented.

FIG. 1 is a schematic diagram of a computing device 10 having a casing 12. The computing device 10 forms the basis of the embodiments to be described. The casing 12 of the device 10 encapsulates a keypad 14, a touch-screen display 16, a speaker 18 and a microphone 20. The device 10 further includes an antenna 22. The device 10 illustrated in FIG. 1 is a mobile device in that it may be held in a user's hand and used to participate in communication sessions, in particular, telephone calls. During such sessions the device 10 may be utilised so that the speaker 18 is held to a user's ear and the microphone 20 is situated in proximity to a user's mouth.

The device 10 is a computing device which operates as a mobile phone. However, further embodiments relate to other computing devices which do not include telephony as their major function.

Figure 2:
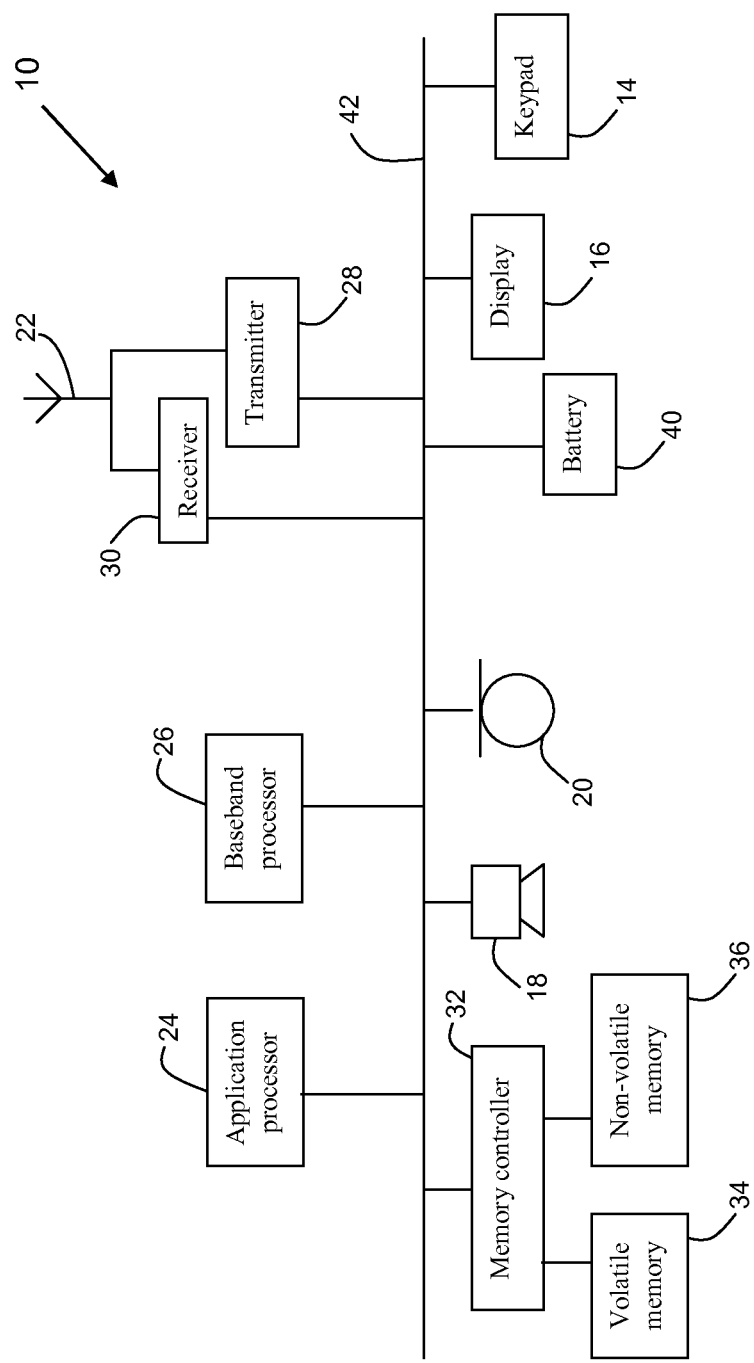
FIG. 2 is a schematic diagram illustrating the arrangement of hardware components of the computing device of FIG. 1.

FIG. 2 is a schematic illustration showing the arrangement of the hardware components of the device 10 of FIG. 1. The keypad 14, display 16, speaker 18 and microphone 20 shown in FIG. 1 communicate with a system bus 42. The bus 42 further communicates with an application processor 24, a baseband processor 26, a transmitter 28, a receiver 30 and a battery 40. Transmitter 28 and receiver 30 communicate with the antenna 22. The bus 42 further communicates with a memory controller 32 which, in turn, communicates with volatile memory 34 and non-volatile memory 36. The application processor 24 processes instructions related to various software modules and operating system software which run on the device 10 and which provide various functionality of the device 10. The baseband processor 26 is concerned with the communication functions and to this end controls a telephony stack and communicates with the transmitter 28 and receiver 30 to establish communications by means of the antenna 22. The various processing elements of the device 10 such as the application processor 24 and baseband processor 26 may be provided on a single processor.

Memory controller 32 controls the access to, and interaction with, volatile memory 34 and non-volatile memory 36. In this manner the application processor 24 is able to communicate with the various hardware elements as well as the memory controller 32 and thereby control the operation of the various hardware elements according to software instructions stored on volatile memory 34 or non-volatile memory 36.

Only a single bus, bus 42, is illustrated in FIG. 2. It is to be realised that this bus may be replaced by two or more buses and that the topology of FIG. 2 would vary accordingly. Furthermore, known computing devices include hardware components additional to those illustrated in FIG. 2.

Figure 3:
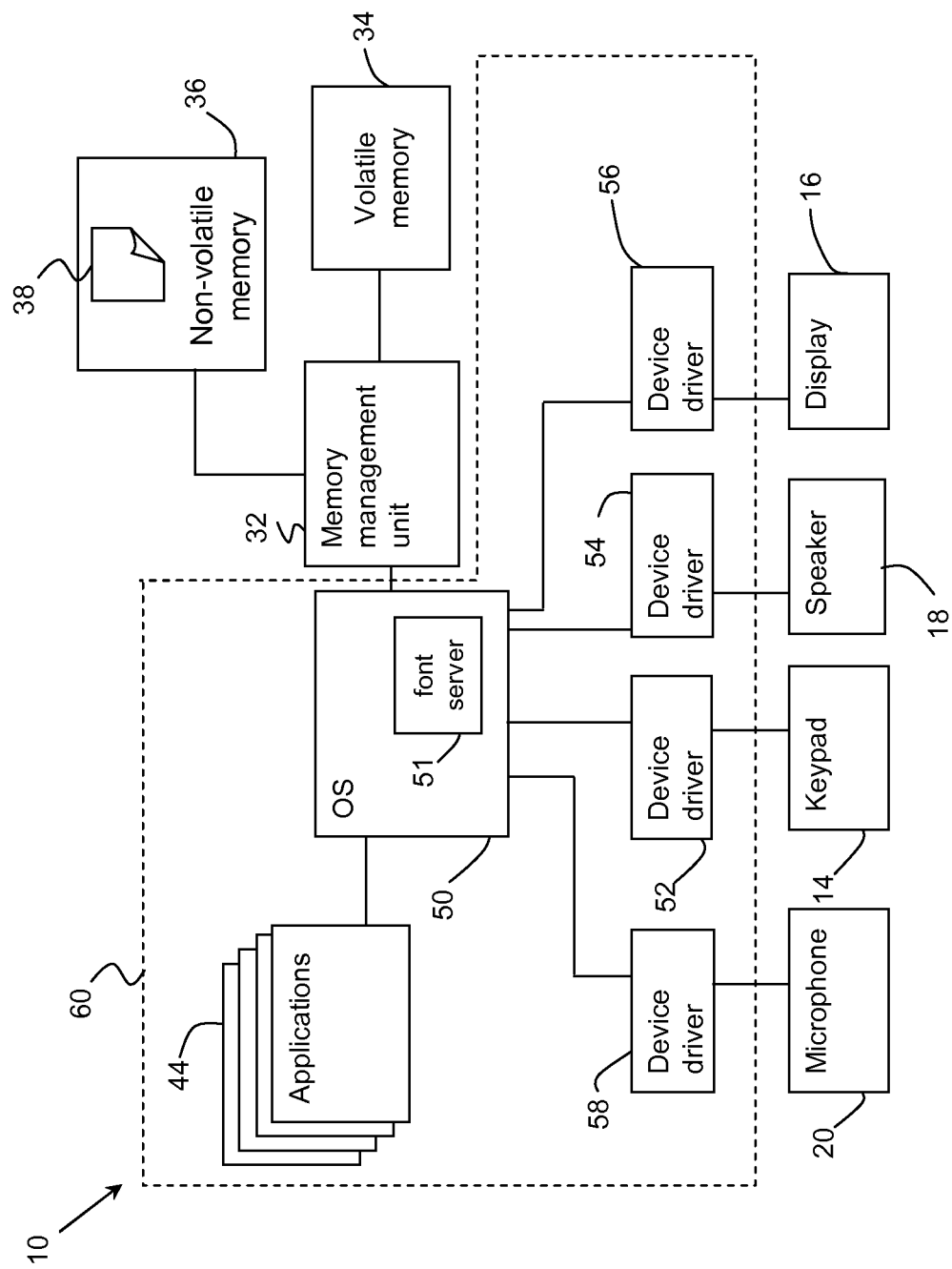
FIG. 3 is a schematic diagram illustrating the arrangement of hardware and software components of the computing device of FIG. 1, when arranged according to a first embodiment of the invention.

FIG. 3 is a diagram illustrating various hardware and software components of the device 10. The software operating on the device 10 can be categorised in various ways. Certain software operates to manage the resources provided by the various hardware components and to establish an operational environment in which other software executes. This software is known as the operating system of the device and is represented in FIG. 3 by an Operating System (OS) 50. The OS 50 interacts with the memory management unit 32 which, as previously described, communicates with volatile memory 34 and non-volatile memory 36. The OS 50 further communicates with a plurality of applications 44 each of which may access the hardware components in a manner dictated by the OS 50. The applications 44 are user applications, which may be started and terminated by the user. FIG. 3 shows that among the contents of the non-volatile memory 36 is a list file 38. In the current embodiment the list file is a text file, however, it is to be understood that in some other embodiments the list file could be of any other file type including but not limited to, a binary file or an XML file.

The OS 50 in this example also comprises a font server 51. One of the roles of the font server is to load font files during a boot-up process of the device 10, for example, after the device is switched on or following a reboot. In the present embodiment, the font server 51 loads each font file stored on the non-volatile memory 36 into the volatile memory 34. This operation enables the font corresponding to the font file for use by software of the device 10, such as, for example, the applications 44.

The OS 50 communicates with the keypad 14 by means of device driver 52, with speaker 18 by means of device driver 54 and with the display 16 by means of device driver 56. Only some of the hardware components have been illustrated but, generally, the OS 50 controls the hardware resources of the device 10 through various device drivers. Furthermore, although the device drivers have been illustrated as separate to the OS 50, it is possible for them to be incorporated into the OS 50.

The software components of FIG. 3 are delineated by dashed area 60. However, this distinction between software and hardware is not essential. Components depicted as software in FIG. 3 may be rendered in hardware, and those depicted as hardware may, in certain circumstances, be rendered as software.

During operation of the device, software instructions stored in non-volatile memory 36 establish the OS 50, the applications 44 and the device drivers 52, 54 and 56. Through the use of the various components illustrated in FIG. 2 a user is able to utilise the device 10 according to the functionality provided by the various applications 44. For example, a user uses the keypad 14 and/or the touch-screen display 16 to communicate with the OS 50 by means of device drivers 52 and 56 to cause one of the applications 44 to access data stored on non-volatile memory 36 by means of memory management unit 32. The OS 50 causes the data supplied by memory management unit 32 to be processed by the applications 44, typically running on the application processor 24. The application processor 24 will return results from the data and instructions, generally utilising volatile memory 34 in the process. On further instructions from the application, the OS 50 will cause the results to be displayed to the user on display 16 by means of device driver 56. It is to be realised that device drivers 52, 54 and 56 are also software components originating from instructions stored on non-volatile memory 36.

The illustration of FIG. 3 is presented merely by way of example; known devices may comprise more components than those shown. Implementations of embodiments are not dependent on the precise arrangement and configuration of components shown in FIGS. 1, 2 and 3. Therefore other components with similar functionality may be substituted and further components added thereto, or illustrated components omitted therefrom, without affecting the operation of embodiments.

Figure 4:
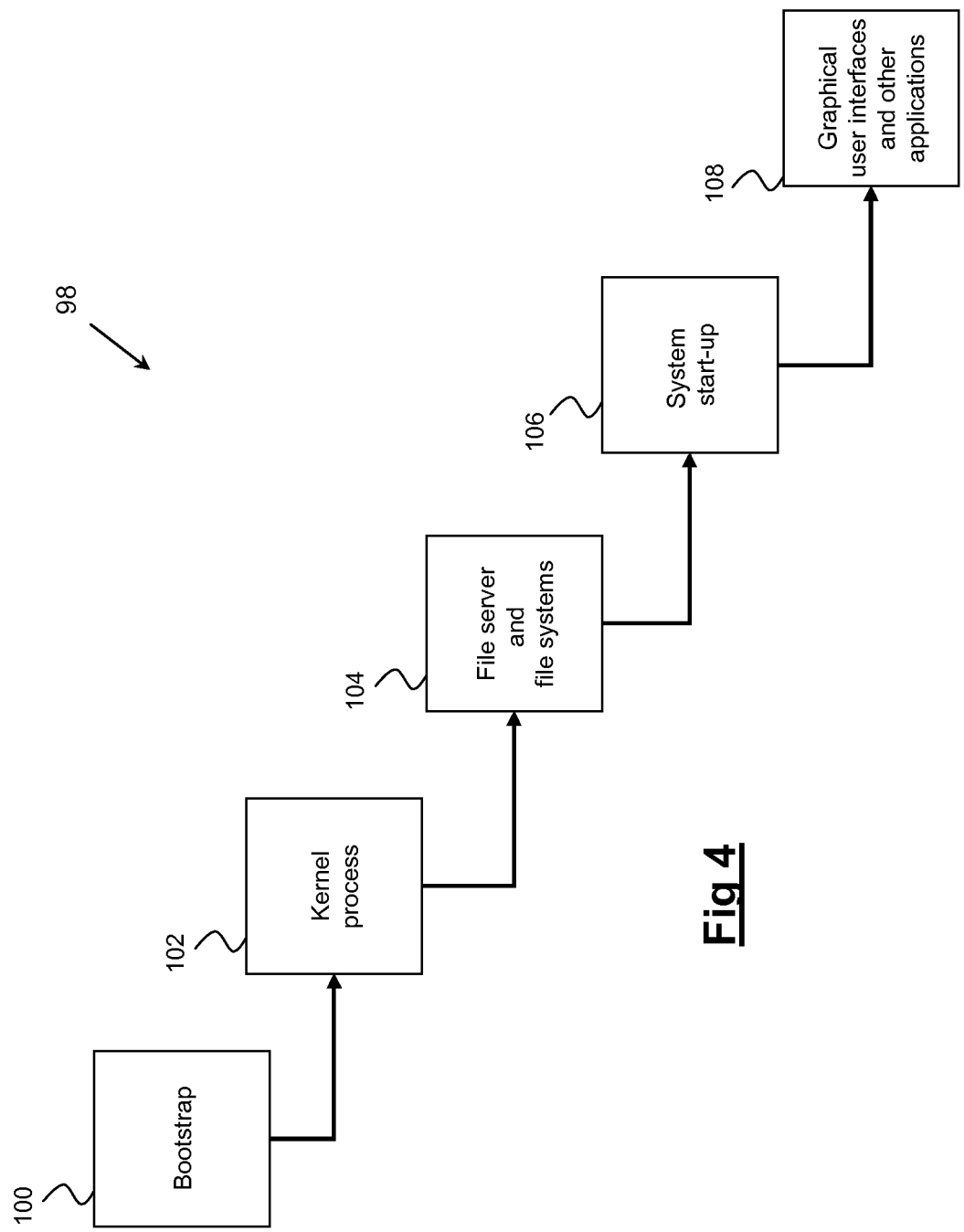
FIG. 4 is a flow diagram of a boot-up process of the computing device of FIG. 1, when arranged according to the first embodiment.

FIG. 4 is a flow diagram illustrating a boot process 98 of the device 10 in the present example. The boot process 98 is activated after the device 10 has been turned on or rebooted, for example, by a human user of the device or a software application running thereon. At step 100, a hardware reset is triggered by activation of a power button (not shown) of the device 10, or the device 10 rebooting. The first software that is executed after this is a bootstrap program stored on the non-volatile memory 36. On entry to the bootstrap, the execution environment is very primitive, and the bootstrap operates to provide a basic execution environment for a kernel process of the OS 50. When this is complete, processing flows to step 102. At step 102, the kernel process is started. At this time the application processor 24 is running and an execution stack allows high-level software programming language code to be run, such as, for example, C++ code. However, there is still only a primitive memory environment and only one execution path. Once initialisation of the kernel process is complete, there is full management of the application processor 24, the memories 34 and 36, the battery 40, and peripherals, such as the display 16 and the speaker 18. Processing then flows to step 104. At step 104 there is a functioning kernel however, the OS 50 has not yet provided the means to instantiate new processes, to read file-based data from the non-volatile memory 36 or to persist data in the volatile memory 34 or the non-volatile memory 36. The process of establishing all of these services occurs in step 104 and once complete, processing flows to step 106. At step 106, all of the kernel and the file server services are fully initialised and ready for the rest of the OS to begin its boot process, using the system starter process. The system starter manages the initialisation of the rest of the OS system services in an ordered manner. The precise order in which the persistence, communications, multimedia, security, and other services are started is chosen to respect dependencies between services, and to start essential services first. Once enough of the system services are running, processing can flow to step 108. At step 108, the primary graphical user interface (GUI) of the OS can be started. In the case of the Symbian® OS, the primary GUI is the windows server. This now allows initialisation of other user interface services and the applications that make up the aspects of the OS that are most evident to a user of the device 10.

Figure 5:
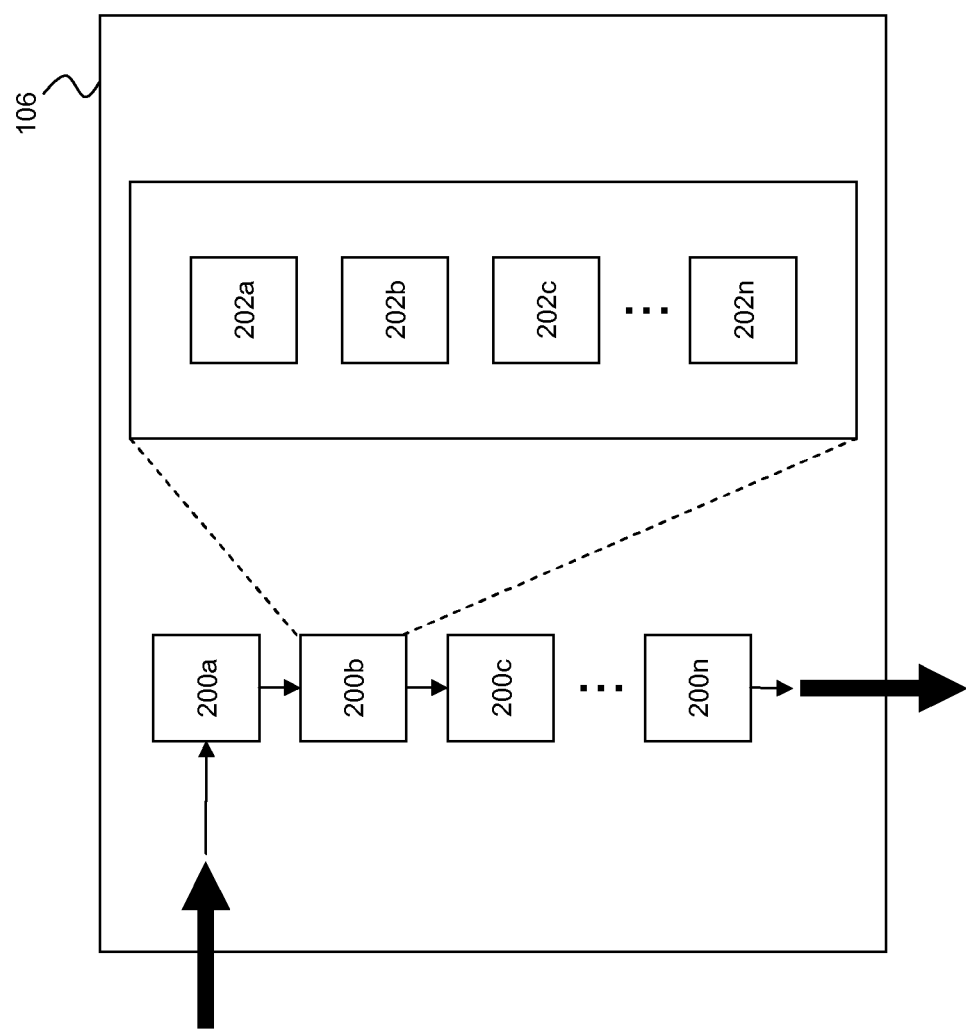
FIG. 5 is a detailed illustration of part of the boot-up process of FIG. 4.

FIG. 5 illustrates in more detail the system starter process discussed above with reference to step 106 of FIG. 4. The system starter process involves the initialisation of a number of OS system services 200*a-n*. As mentioned above, the OS system services 200*a-n* are initialised in an ordered manner which respects dependencies between different services and ensures that vital services are started first. The OS system services 200*a-n* include but are not limited to, graphics, audio, security and communications services. The OS system service 200*b* represents the font server 51 of the OS 50. The font server 51 represents part of a graphics service as it initialises the various fonts so that they can be used by the OS 50 and other software of the device 10, such as the applications 44. As can be seen in FIG. 5, once the font server 51 is initialised, the font server 51 loads a number of font files 202*a-n* stored on the device 10. In particular, the font server 51 reads a number of font files from the non-volatile memory 36 and then loads them into the volatile memory 34. It is to be understood that this process can involve a step of decompression if the font files are stored on the non-volatile memory 36 in a compressed state. In the present embodiment, the font server 51 loads each font file stored on the non-volatile memory 36. However, in other embodiments the font server 51 may only load a subset of all the font files stored on the non-volatile memory 36. For example, the device may be able to identify which fonts are required in order to initialise the device 10 and only load font files corresponding to those identified fonts. Thereafter, if any unloaded fonts are required, the device 10 is further capable of loading the corresponding font files at that time.

In any case, during the system start-up step 106 (FIG. 4) of the boot up process 98 the font server 51 loads a number of font files. In the event that one of the font files is corrupt, the loading of that font file can cause the device 10 to crash during the boot-up process. This may force the device 10 to reboot. The next time the device 10 boots up the font server 51 may again try to load the same corrupted font file which may again cause the device 10 to crash. This operation can cause a continuous reboot cycle, wherein the device 10 keeps rebooting midway through booting up thereby rendering the device 10 unusable.

Figure 6:
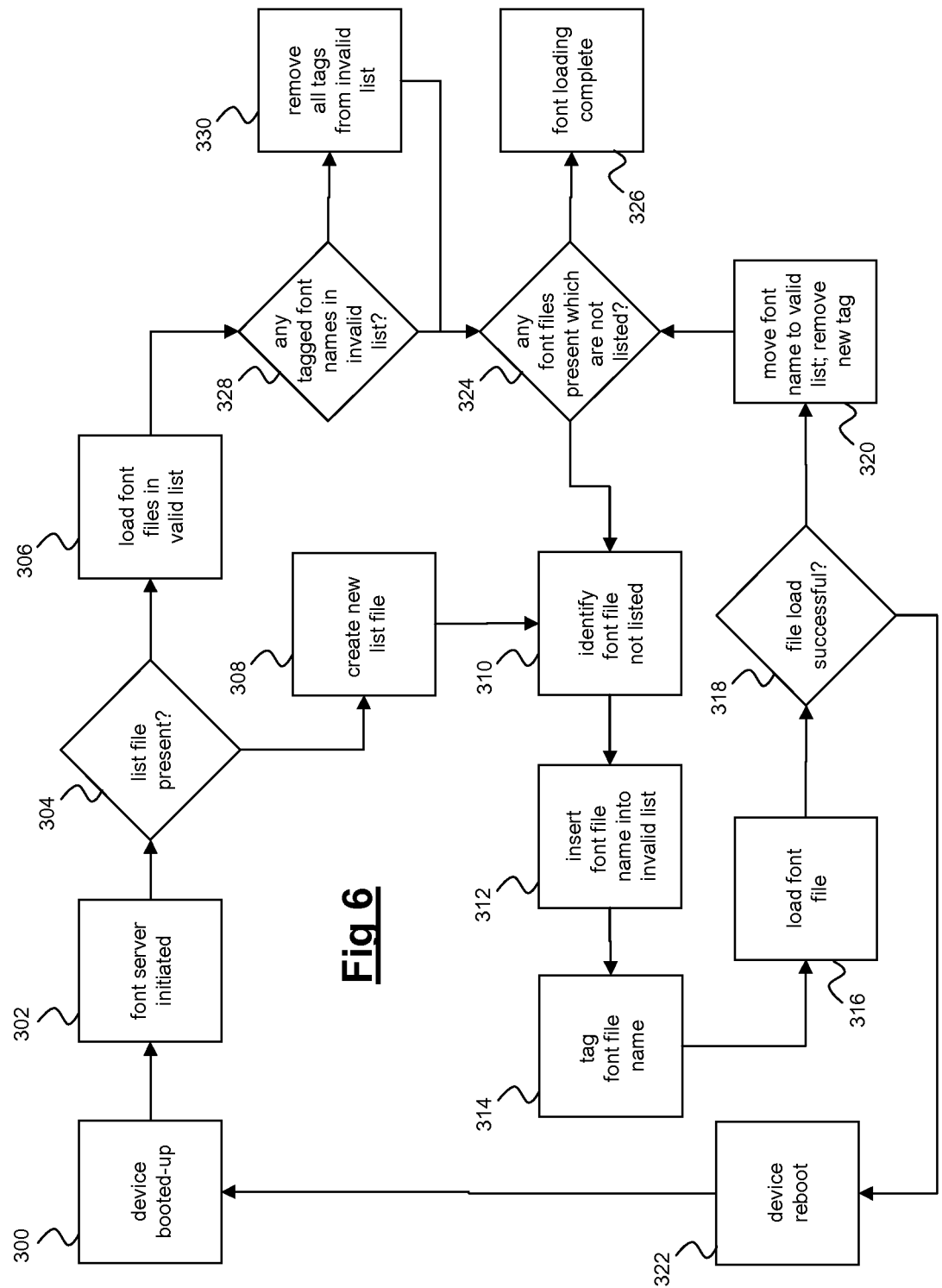
FIG. 6 is a flow diagram illustrating the operation of the computing device of FIG. 1, when arranged according to the first embodiment.

FIG. 6 provides a flow diagram which illustrates the operation of the font server 51 to load all the font files stored on the non-volatile memory 36. The operation of FIG. 6 avoids causing a continuous reboot cycle by using the list file 38 stored on the non-volatile memory 36. Processing in FIG. 6 starts at step 300.

At step 300, the device 10 is booted up. In the present case, a user of the device initiates the boot up by pressing a power button (not shown) of the device 10. However, it is equally valid that a reboot causes the device to boot-up. Also, the re-boot could be initiated by a user of the device, an application of the device or the OS 50. In any case, processing flows to step 302, once the boot up process 98 reaches step 106, i.e. system start up. At step 302, the font server 51 is initialised. This causes processing to flow to step 304, wherein the font server 51 checks for the presence of the list file 38 on the non-volatile memory 36. In the present embodiment, if the list file 38 is stored on the non-volatile memory 36 it is located at a specific memory location. However, in other embodiments, the list file 38 may be stored anywhere on the non-volatile memory 36 and the font server 51 is capable of searching the non-volatile memory 36 in order to locate the file. In any case, if the list file 38 is present on the non-volatile memory 36 then processing flows to step 306, which is discussed later. Alternatively, if no list file is present, processing flows to step 308. If no list file is present then this generally indicates that this is the first time that the device 10 has been activated, or the device 10 has just been formatted.

At step 308, the font server creates a new list file on the non-volatile memory 36. The list file comprises two list portions, an invalid list portion (hereinafter, 'invalid list') and a valid list portion (hereinafter, 'valid list'). Each list of the list file 38 is for storing one or a number of file representations. In the present embodiment each representation comprises a filename. However, in some other embodiments other representation types are used, such as, for example, a file location or a unique file identifier. Once the new list file has been created processing flows to step 310. At step 310, the font server 51 identifies a font file which is not listed in either list of the list file 38. The lists of the list file 38 are currently blank and therefore there will be a number of font files which are present and not listed. Therefore, in step 310 the font server 51 selects one of them in accordance with its internal logic. In the present embodiment, the font server 51 will identify the first font file according to the order in which they are stored on the non-volatile memory 36. However, in other embodiments other orders are equally valid, for example, the font server 51 could identify the first font file in alphabetical order. In any case, once the first font file has been identified processing flows to step 312.

At step 312, the font server 51 writes a representation of the identified font file into the invalid list of the list file 38. As mentioned above, the representation comprises the name of the file. Next, at step 314, the font server 51 tags the font file name as 'new', following which processing flows to step 316. At step 316, the font server 51 loads the font file and processing flows to step 318. At step 318, there are two possible outcomes to the file loading operation. Either the font file loads successfully, in which case processing flows to step 320, or the font file does not load successfully, in which case processing flows to step 322. Processing may flow to step 322 if the font file is corrupt. At step 322, the device 10 crashes and reboots, after which processing flows back to step 300. Returning to step 300 causes the font server operation to start again as defined by the flow diagram of FIG. 6. Alternatively, if the file load at step 316 was successful, then processing flows from step 318 to step 320. In practise, the first embodiment detects that the file load was successful if the device 10 is still operational following the file load.

At step 320, the font server moves the font file name from the invalid list to the valid list, and removes the 'new' tag. Once the file name has been moved processing flows to step 324, wherein the font server identifies if any other font files are present which are not yet listed. At present only one file name has been listed and therefore, it is highly likely that further font file names will be present. In this case, processing will flow around the above-described loop until processing returns to step 324 and there are no further font files which are present on the non-volatile memory 36 and which are not listed in the list file 38. At this time, processing will flow from step 324 to step 326 wherein font file loading is complete. Once font file loading is complete the boot process 98 returns to step 106 of FIG. 5 wherein, the next system service is initialised. If all system services have been initialised then the boot process will flow to step 108 of FIG. 5, as discussed above.

As mentioned briefly above, at step 304, if a list file is present, processing flows to step 306. It is noted that this will generally be the case unless the device is being booted up for the first time or following being formatted. At step 306, the font server 51 loads all of the font files listed in the valid list, following which processing flows to step 328. At step 328, the font server 51 searches the list file 38 to identify any font file names in the invalid list which have been tagged 'new'. In the event that no tagged font file names are found processing flows to step 324, which was discussed above. Alternatively, if a tagged font file name is identified in step 328, processing flows to step 330. Processing will flow in this way if the last time the file server 51 operated, it attempted to load a font file which caused the device 10 to crash. In other words, processing flowed via step 322 back to step 300, and then from step 300, via steps 302, 304, 306, 328 to step 330. In this case, at step 330, the new tag is removed and the font file name is left in the invalid list. Leaving the font file name in the invalid list in an untagged state shows that the font file should not be loaded as it will cause the device 10 to crash during boot-up. According to this operation, continuous rebooting cycles are avoided. Once the 'new' tag is removed at step 330, processing flows to step 324, which was discussed above.

According to the above described operation of the first embodiment of the invention, once each font file stored in the non-volatile memory has been loaded its file name appears in the list file 38. In particular, the file name is written in the valid list if the font file loads successfully, or the invalid list if it does not load successfully. Once each font file name has been written in the list file 38, the next time the device 10 is booted up, only those font files in the valid list are loaded by the font server 51. Any font files in the invalid list are not loaded. Accordingly, continuous reboot cycles are avoided. In particular, a font file which causes the device to crash while booting is only permitted to be loaded once, thereafter its name is stored in the invalid list and it will not be loaded during boot-up again.

It is to be understood that the font server provides a means for identifying files to be loaded during a boot-up process of the device 10. The font server also provides a means for determining if loading a file causes the device 10 to crash. The font server also provides a means for updating the list file 38 to indicate whether loading a particular file causes the device 10 to crash. The font server also provides a means for loading files during the boot-up process in dependence on the content of the list file 38.

In the event a new font file is loaded onto the non-volatile memory 36, during the next boot up following the addition of the new font file, the font server 51 detects the presence of the new file at step 324 and adds the name of the new file to the invalid list of the list file 38 at step 312. If the new file loads successfully its name is moved to the valid list at step 322. Alternatively, if the file does not load successfully then its name remains in the invalid list. It is noted that a new font file can be added to the device 10 in a number of ways. For example, the user could install a new application onto the device 10 which could include one or a number of new font files. Additionally or alternatively, an automatic software update may add one or number of new font files to the device 10.

In the event that an existing font file is modified, the font server 51 detects this and ensures that the file name is re-inserted into the invalid list and tagged as new. If the unmodified version of the file was in the valid list then this entry is removed at the same time. Accordingly, the modified file will be treated as a new file again and will only be moved to the valid list if it does not cause the device 10 to crash when the file is loaded.

It is an advantage of the first embodiment that the number of times a file is written to in order to protect the device 10 from continuous reboot cycles is minimised. Accordingly, any boot-up time increase resulting from the above-described operation of the font server is also minimised. In turn, this means that boot-up time is not prolonged unnecessarily which would degrade the user experience. In particular, the list file 38 is only written to at the beginning to position the file name of each font file in the correct list. Once all the font file names are in the correct list, the font server only reads from the list file 38 to establish which files to load. Stated differently, the font server does not have to write to the list file once the file name of each font file on the device 10 is positioned in the correct list. Accordingly, the font server can automatically detect invalid files without having to perform any file writes.

In the first embodiment, the non-volatile memory is a flash memory drive. A further advantage of the operation of the first embodiment is that excessive wear on the flash drive is reduced. In particular, excessive wear can occur if repeated writing operations are performed on the flash drive. As the operation of the first embodiment minimises the number of file writes necessary to detect invalid files, the first embodiment also prolongs the life of the flash memory.

It is an advantage of the first embodiment that the list file 38 is created and automatically updated by the font server 51. Moreover, it is not the responsibility of a user of the device to maintain the list file 38. This is an advantage as to maintain the list file 38 the user would have to have an intimate knowledge of the font files present on the device 10. According to the first embodiment, the user can simply install new font files onto the device and the font server will automatically detect invalid files and automatically protect the device 10 from continuous reboot cycling.

In the first embodiment, the list file 38 comprised two lists, an invalid list and a valid list. However, in other embodiments, it would be equally valid for the font server to create and manage two list files, wherein one file contains the valid list and the other contains the invalid list. The list file may be a text file, a binary file, an XML file, or of any other file type.

In the first embodiment, when the font server inserts a new font file name into the list file the font server tags that file name as new. The purpose of this being that the font server knows which file to move to the valid list in the event that a file load is successful. In other embodiments, the font server does not need to tag file names. However, in such embodiments the font server has to remember the file name of the current file being tested so that it knows which file name to move to the valid list if a loading test is passed (step 318).

Figure 7:
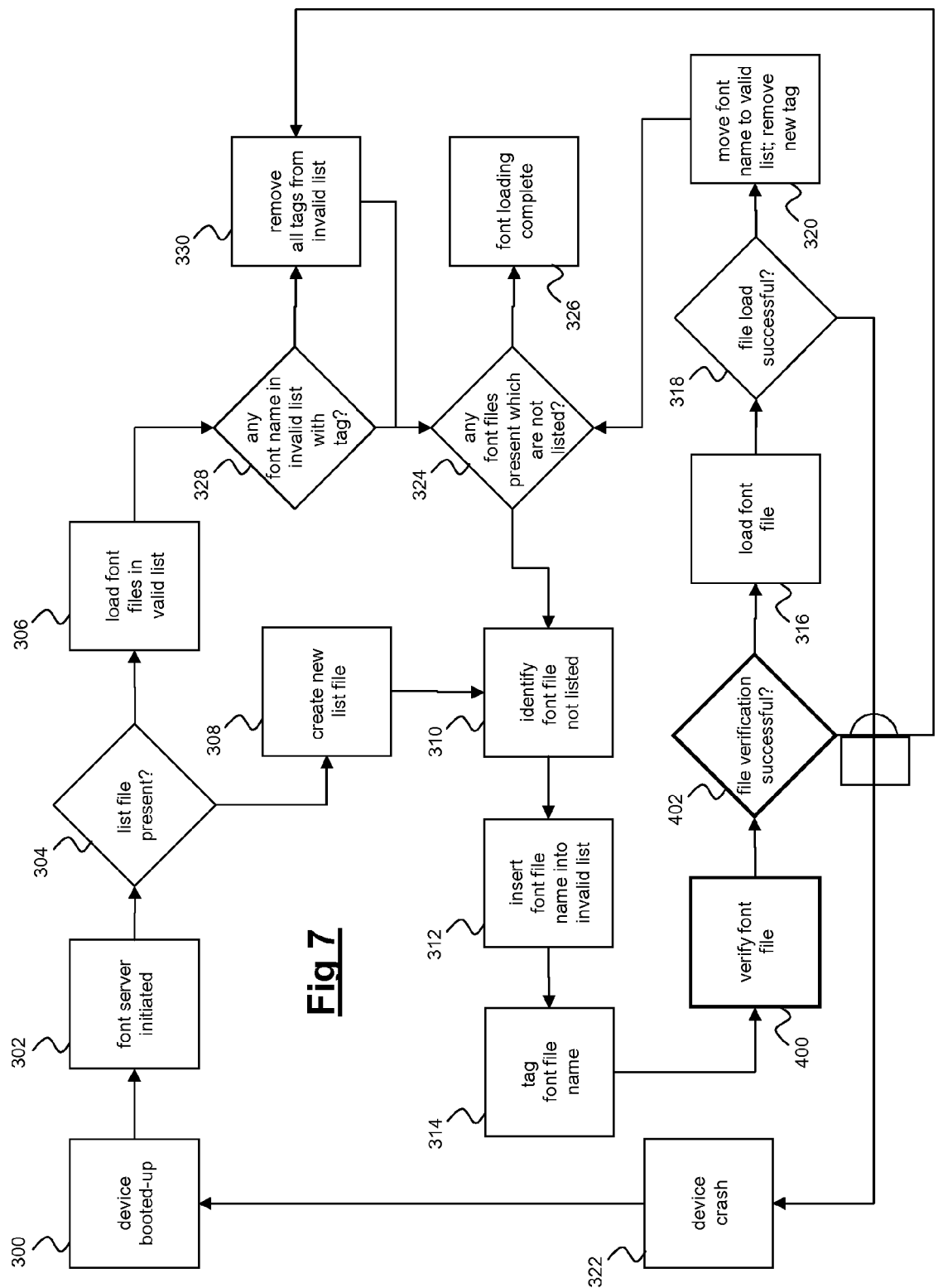
FIG. 7 is a flow diagram illustrating the operation of the computing device of FIG. 1, when arranged according to a second embodiment of the invention.

The operation of FIG. 6 can be modified to form a second embodiment of the invention. FIG. 7 provides a flow diagram of the operation of the second embodiment. The following describes the aspects of FIG. 7 which are different from FIG. 6. In particular, new steps 400 and 402 are inserted in between steps 314 and 316.

At step 314, a new font file name which has been inserted into the invalid list is tagged as 'new'. In FIG. 7, once the file name has been tagged, processing flows to new step 400. At step 400, the font server 51 verifies the new font file. File verification performs one or a number of tests on the file before the file is loaded. The purpose of each verification test is to determine is the file will cause the device to crash if it is loaded. Once the file verification test has been performed processing flows to new step 402, wherein the outcome of the test is considered. In the second embodiment, the font server checks the font file size to confirm it is greater than zero. In the event that the file size is greater than zero, the font server assumes that the font file is valid and will not crash the device 10 if it is loaded. Accordingly, processing flows from step 402 to step 316, which was discussed above with reference to the first embodiment and FIG. 6. Alternatively, if the file size is zero, the font server assumes that the font file is corrupt and will crash the device 10 if it is loaded. Accordingly, processing flows from step 402 to step 330, which was discussed above with reference to the first embodiment.

An advantage of the second embodiment is that the font server can identify, in certain cases, a font file which will crash the device 10 if it is loaded. Accordingly, upon identifying such a font file, the font server can avoid loading the file. Further, the font server can de-tag the file name and leave it in the invalid list so that the file is not loaded during boot-up. Therefore, the second embodiment avoids having to go through the process of loading the corrupt file, crashing the device and re-booting device. According to this operation, the second embodiment can reduce the boot-up time and thereby improve the user experience.

In the second embodiment the font server performed a single verification test. In other embodiments of the invention any number of verification tests may be performed. Furthermore, a different verification test may be performed. For example, the font server could determine if the memory tables that the font file points to are correct, that the font file contains the correct syntax, or that the font file contains the correct data type.

In addition, the advantages and alternative features stated in connection with the first embodiment apply equally to the second embodiment.

Figure 8:
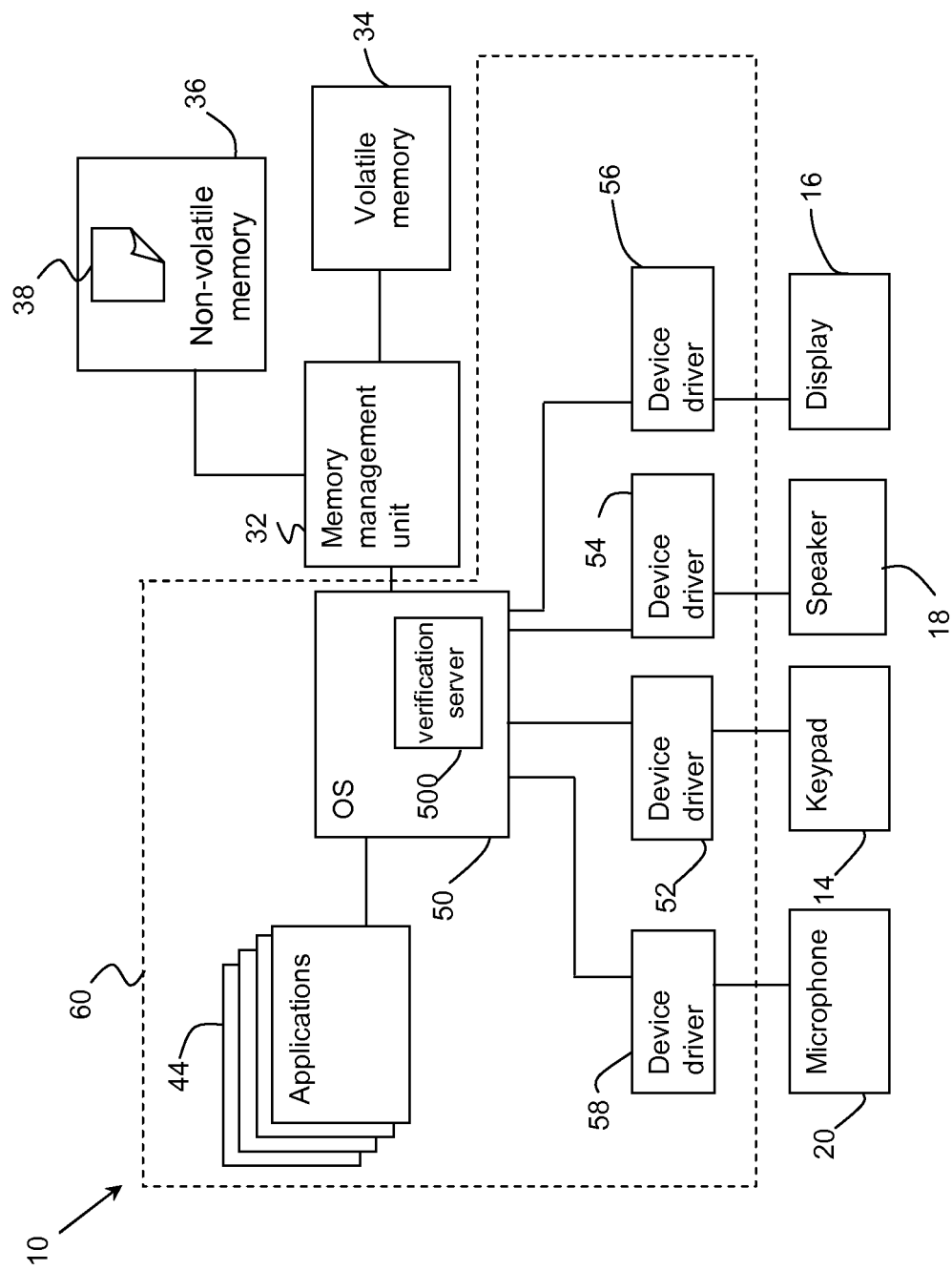
FIG. 8 is a schematic diagram illustrating the arrangement of hardware and software components of the computing device of FIG. 1, when arranged according to a third embodiment of the invention.

FIG. 8 is a diagram illustrating various hardware and software components of the device 10 when it is arranged according to a third embodiment of the invention. The following describes the differences between the components of FIG. 8 and the components of FIG. 3.

In FIG. 8, the OS 50 comprises a verification server 500. A function of the verification server 500 is to automatically detect and prevent the loading of invalid (i.e. corrupt) files during boot-up of the device 10. Accordingly, the verification server 500 functions to automatically prevent continuous reboot cycles.

Figure 9:
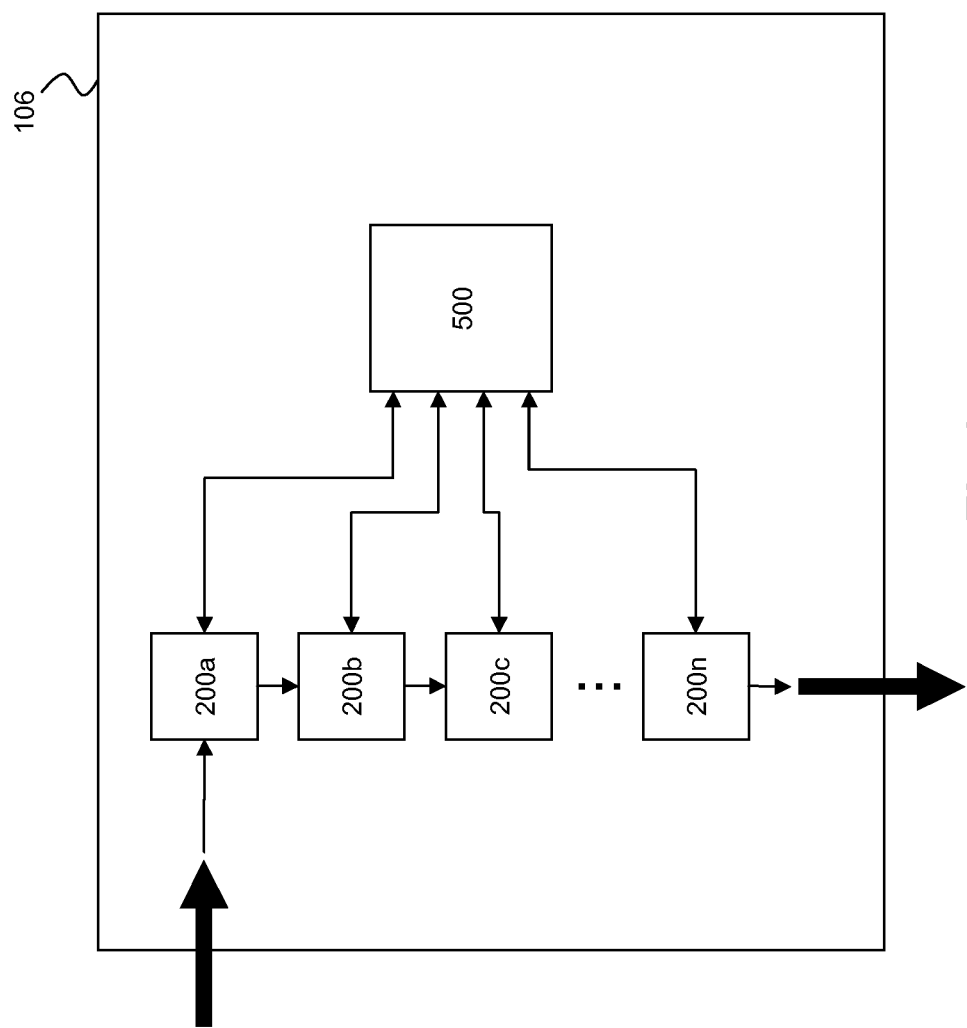
FIG. 9 is a detailed illustration of part of the boot-up process of FIG. 4, when the computing device is arranged according to the third embodiment; and, FIG. 10 is a flow diagram illustrating the operation of the computing device of FIG. 1, when arranged according to the third embodiment.

FIG. 9 illustrates in more detail the system starter process discussed above with reference to step 106 of FIG. 4, when the device 10 is arranged according to the third embodiment. As mentioned above, the system starter process involves the initialisation of a number of OS system services 200*a-n*. FIG. 9 shows that each of the OS system services 200*a-n* communicates with the verification server 500. In particular, each of the OS system services 200a-n communicates with the verification server 500 when they need to load a file during boot-up. The file can relate to any OS system service and is not limited to graphics services or fonts. For example, the file could relate to files such as device drivers, or services such as, security, communication or audio services. When the service 200a-n communicates with the verification server 500 it sends a verification request which specifies a representation of a file that needs to be loaded. In the present embodiment the file representation comprises the file name. However, in some other embodiments a different representation could be used, such as, for example, a file location or a unique file identifier. On receiving the verification request, the verification server 500 identifies whether or not the file is valid. If the file is valid, the verification server 500 permits the file to be loaded. On the other hand, if the file is invalid, the verification server 500 prevents the file from being loaded. According to this operation, the verification server 500 operates to automatically avoid continuous reboot cycling.

Figure 10:
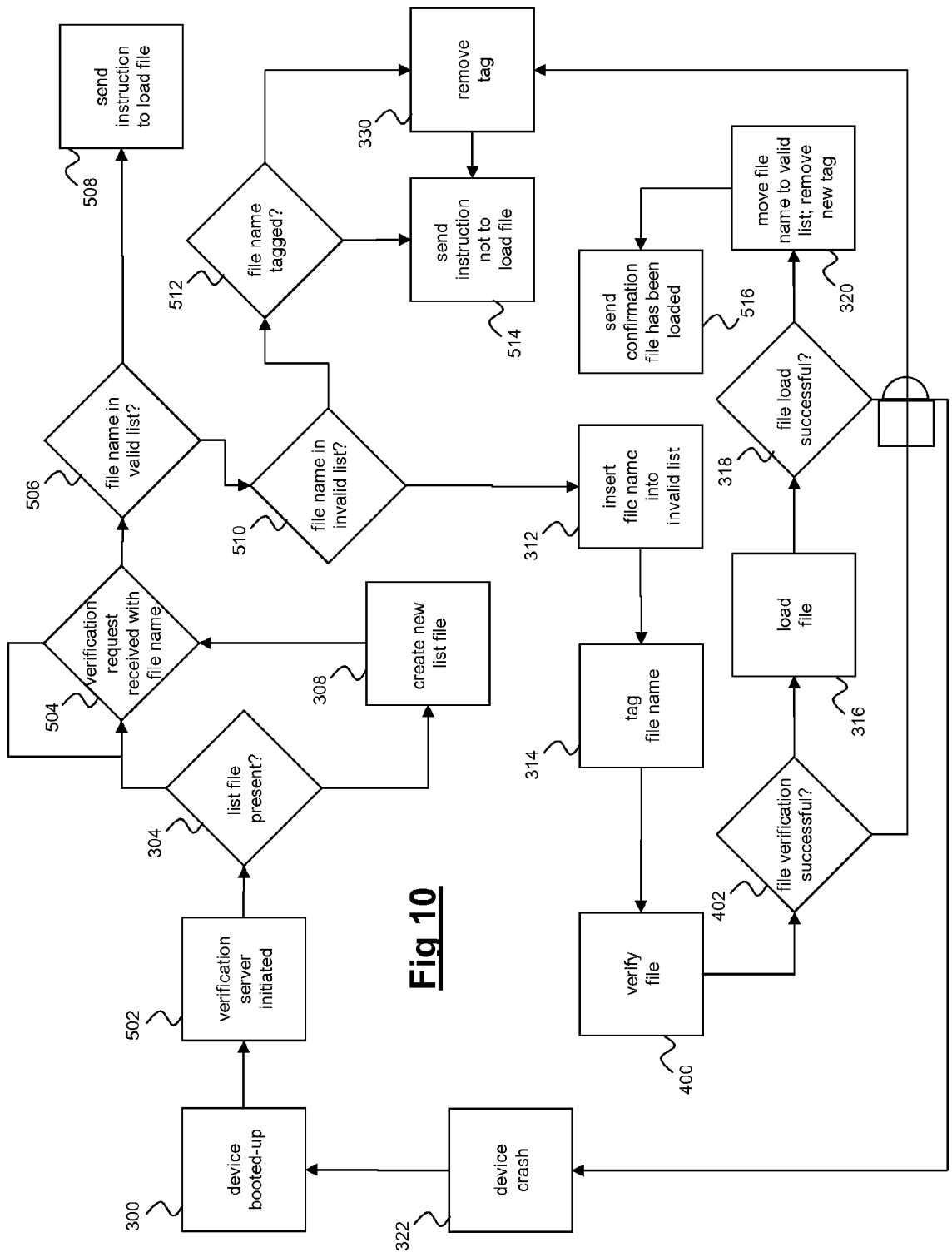

FIG. 10 provides a flow diagram which defines the operation of the third embodiment of the invention. Where step numbers in FIG. 10 are the same as those in FIGS. 6 and 7, those steps in FIG. 10 relate to the same operations as those defined in relation to FIGS. 6 and 7. Processing in FIG. 10 starts at step 300.

At step 300, the device 10 boots-up. In the present case, a user of the device initiates the boot up by pressing a power button (not shown) of the device 10. However, it is equally valid that a reboot causes the device to boot-up. Also, the re-boot could be initiated by a user of the device, or an application of the device, such as, the OS 50. In any case, processing flows to step 502, once the boot up process 98 reaches step 106, i.e. system start up.

At step 502, the verification server 500 is initialised. This causes processing to flow to step 304, wherein the verification server 500 checks for the presence of the list file 38 on the non-volatile memory 36. In the present embodiment, if the list file 38 is stored on the non-volatile memory 36 it is located at a specific memory location. However, in other embodiments, the list file 38 may be stored anywhere on the non-volatile memory 36 and the verification server 500 is capable of searching the non-volatile memory 36 in order to locate it. In any case, if the list file 38 is present on the non-volatile memory 36 then processing flows to step 504, which is discussed later. Alternatively, if no list file is present, processing flows to step 308. If no list file is present then this generally indicates that this is the first time that the device 10 has been activated, or the device 10 has just been formatted.

At step 308, the verification server 500 creates a new list file on the non-volatile memory 36. The list file comprises two list portions, an invalid list portion and a valid list portion. Each list of the list file 38 is for storing one or a number of file representations. In the present embodiment, the file representations comprise file names. Once the new list file has been created, processing flows to step 504.

At step 504, the verification server 500 waits until a verification request is received from one of the OS system services 200a-n. When a verification request is received processing flows from step 504 to step 506. It is noted that each verification request received by the verification server 500 comprises a representation of a file. In the third embodiment, the representation comprises the file name. However, in some other embodiments it is equally valid that other file representations are used. For example, in some embodiments a file location or a unique file identifier is used. Moreover, the verification request is a request from an OS system service to confirm if the file who's file name accompanies the request is valid. At step 506, the verification server 500 identifies whether the file name passed with the request is listed in the valid list of the list file 38. In the event that it is, processing flows from step 506 to step 508, wherein the verification server 500 responds to the OS system service which sent the verification request. In particular, the verification server 500 confirms that the OS system service can safely load the file without crashing the device 10.

Alternatively, if at step 506 the file name is not in the valid list, processing flows to step 510. At step 510, the verification server 500 determines if the file name is in the invalid list. If it is then processing flows to step 512, else processing flows to step 312. At step 512, the verification server 500 checks to see if the file name is tagged as new in the invalid list. This will be the case if the last time the verification server 500 was operated it loaded the file and that crashed the device 10. In this case, the new tag is removed from the file name at step 330, following which processing flows to step 514. Alternatively, if the file name is not tagged then processing flows from step 512 directly to step 514. At step 514, the verification server 500 responds to the OS system service which made the initial verification request at step 504 and tells that OS system service not to load the file.

As mentioned briefly above, processing flows from step 510 to step 312 if the file name is not in either the valid or invalid list of the list file 38. This will be the case if the file represented by the file name is a new file. At step 312, the file name is inserted into the invalid list of the list file 38, following which processing flows to step 314. At step 314, the verification server 500 tags the file name just inserted, following which processing flows to step 400. At step 400, the verification server 500 verifies the file. In the present embodiment, the verification test comprises checking that the file size is greater than zero. In the event that the file size is zero, the verification test fails and processing flows from step 400 to step 402 and then step 330, which is discussed above. Alternatively, if the file size is greater than zero, the verification test is passed at step 402 and processing flows to step 316. At step 316 the file is loaded and processing flows to step 318. At step 318, the result of the file load is considered. If the file loaded successfully at step 316, then processing flows to step 320. In practise, the third embodiment detects that the file load was successful if the device 10 is still operational following the file load. At step 320, the file name is de-tagged and moved from the invalid list to the valid list. Processing then flows to step 516, wherein the verification server 500 responds to the OS system service which made the verification request at step 504 and confirms that the file has been loaded successfully. Alternatively, if at step 318 the file load is not successful then the device crashes and processing flows to step 322, following which processing returns to step 300 when the device reboots.

According to the above described operation, the verification server 500 can be used to verify each file loaded by the OS system services 200a-n. Alternatively, the verification server 500 can be used to verify only a subset of the files loaded by the OS system services 200a-n. In any case, if a file is corrupt and causes the device to crash then that file enters the invalid list. If the file is not corrupt then the OS system service 200a-n is either informed that it can load the file or informed that the verification server has already loaded the file. In subsequent boot-ups the verification server will prevent OS system services from loading files in the invalid list and will permit OS system services to load files in the valid list. According to this operation, continuous reboot cycling is automatically prevented.

It is to be understood that the verification server provides a means for identifying files to be loaded during a boot-up process of the device 10. The verification server also provides a means for determining if loading a file causes the device 10 to crash. The verification server also provides a means for updating the list file 38 to indicate whether loading a particular file causes the device 10 to crash. The verification server also provides a means for loading files during the boot-up process in dependence on the content of the list file 38.

In the event that an existing file is modified, the verification server detects this and ensures that the file name is re-inserted into the invalid list and tagged as new. If the unmodified version of the file was in the valid list then this entry is removed at the same time. Accordingly, the modified file is treated as a new file again and will only be moved to the valid list if it does not cause the device 10 to crash when the file is loaded.

It is an advantage of the third embodiment that any OS system service can use the verification server 500 to automatically determine if a file can be loaded or not. Accordingly, any file which needs to be loaded during boot-up can be run through the verification server. Additionally, all files which need to be loaded during boot-up can be run through the verification server. Stated differently, continuous reboot cycling resulting from any file loaded during boot-up is automatically prevented. Either a corrupt file is detected at verification step 318, or the corrupt file is loaded once, detected following a reboot at step 312, and never loaded again.

It is an advantage of the third embodiment that the number of times a file is written to in order to protect the device 10 from continuous reboot cycles is minimised. Accordingly, any boot-up time increase resulting from the above-described operation of the verification server is also minimised. In turn, this means that boot-up time is not prolonged unnecessarily which would degrade the user experience. In particular, the list file 38 is only written to at the beginning to position the name of each file in the correct list. Once all the file names are in the correct list, the verification server only reads from the list file 38 to establish which files can be loaded. Stated differently, the verification server does not have to write to the list file once the name of each file to be loaded during boot-up is positioned in the correct list. Accordingly, the verification server can automatically detect invalid files without having to perform any file writes.

In the third embodiment the non-volatile memory is a flash memory drive. A further advantage of the operation of the third embodiment is that excessive wear on the flash drive is reduced. In particular, excessive wear can occur if repeated writing operations are performed on the flash drive. As the operation of the third embodiment minimises the number of file writes necessary to automatically detect invalid files, the first embodiment also prolongs the life of the flash memory.

In the third embodiment, if the verification server identifies that a file is invalid (i.e. corrupt) it informs the OS system service not to load the file. In some other embodiments, the verification server could additionally or alternatively load a default file which corresponds to the invalid file. In particular, the loading of the file may be essential for the device 10 to enter an operational state. If this is the case, then simply instructing the corresponding OS system service not to load the file will prevent the device from entering an operational state. Accordingly, the verification server could store a number of old but valid copies of essential files so that in the event the current version is corrupt, the verification server can load the valid old version of the file. According to this operation, the device will then be able to enter an operational state. In some embodiments, the device could automatically detect that a current version of a file is invalid and automatically instruct a user of the device to obtain a current version of the file which is valid, for example, via an appropriate message on the display 16.

It is an advantage of the third embodiment that the list file 38 is created and updated automatically by the verification server. Moreover, it is not the responsibility of a user of the device to maintain the list file 38. This is an advantage as to maintain the list file 38 the user would require an intimate knowledge of the files which were loaded during boot-up. According to the third embodiment, the user can simply install new files onto the device and the verification server will automatically protect the device 10 from continuous reboot cycling if those files are loaded during boot-up and cause the device to crash.

In the third embodiment, the list file 38 comprised two lists, an invalid list and a valid list. However, in other embodiments, it would be equally valid for the font server to create and manage two list files, wherein one file contained the valid list and the other contained the invalid list. The list file could be a text file, a binary file, an XML file, or a file of any other file type.

In the third embodiment, when the verification server inserts a new file name into the list file the verification server tags that file name as new. The purpose of this is so that the verification server knows which file to move from the invalid list to the valid list in the event that a file load test is successful (step 318). In other embodiments, the verification server does not tag file names. However, in such embodiments the verification server needs to remember the file name of the current file being tested so that it knows which file name to move to the valid list if the file passes the loading test.

The third embodiment included the verification stage represented by steps 400 and 402. However, it is to be understood that in some other embodiments steps 400 and 402 could be omitted. Such embodiments would therefore correspond with the first embodiment described above.

The first, second and third embodiments have been discussed with reference to loading files during the system start-up stage (step 106) of the boot-up process 98. However, it is to be understood that some other embodiments of the invention could relate to different boot-up processes. Further, some other embodiments could relate to file loading which occurs at a different stage in the boot-up process. For example, some other embodiments may relate to file loading during the GUI and other application loading stage (i.e. step 108) of FIG. 4.

The first, second and third embodiments have been discussed above with reference to files which either load successfully or crash the device. It is to be understood that some other embodiments could also operate with files which are corrupt but which do not crash the device. In such cases, the new tag relating to the file would be removed and the file name would remain in the invalid list. Alternatively, if file tagging was not performed then the file name would just be left in the invalid list.

In the first, second and third embodiments discussed above the list file 38 lists file names. However, it is to be understood that in other embodiments of the invention file representations other than names are used. For example, the list file 38 could list file locations or unique file identifiers. Alternatively, a code could be generated for each file and that code could be used as the representation stored in the list file. Furthermore, in the third embodiment the verification server has been discussed above with reference to receiving a single file representation with each verification request. In some other embodiments more than one file representation could be passed with a verification request. Any number of file representations could be passed with some verification requests.

Finally, various additions and modifications may be made to the above described embodiments to provide further embodiments, apparent to the intended reader being a person skilled in the art, any and all of which are intended to fall within the scope of the appended claims.

What is claimed is:

1. A method comprising:
    identifying at least one new file to be loaded in a computing device during a boot-up process of the computing device;
    writing a representation of at least one of the identified new file in an invalid portion of a list on the computing device, wherein the list comprises a valid portion and the invalid portion;
    determining if loading at least one of the identified new file causes the computing device to crash;
    updating a list on the computing device in dependence on whether the loading of the identified new file causes the computing device to crash, wherein in an instance in which loading the identified new file causes the computing device to crash, the representation is maintained in the invalid potion, and wherein in an instance in which the loading the identified new file does not cause the computing device to crash, the representation is moved to the valid portion;
    identifying a default file associated with the identified new file which causes the computing device to crash; and
    loading a file from the at least one new file in the computing device during a boot-up process of the computing device in dependence on the list to prevent the computing device crashing during the boot-up process;
    wherein the default file is loaded in the place of the identified new file which causes the computing device to crash.

2. The method according to claim 1, wherein determining if loading at least one of the identified new file causes the computing device to crash comprises loading the identified new file and detecting if the computing device has not crashed.

3. The method according to claim 1, wherein each representation written in the invalid portion is tagged, and updating the list further comprises de-tagging a representation in the invalid portion if loading the identified new file corresponding to the representation is determined to cause the computing device to crash.

4. The method according to claim 1, wherein files having a representation in the invalid portion are not loaded, and wherein files having a representation in the valid portion are loaded.

5. The method according to claim 1, wherein identifying at least one new file to be loaded in the computing device during a boot-up process of the computing device further comprises identifying files to be loaded during the boot-up process not having a representation in the list.

6. The method of claim 1, wherein the default file is an old version of the identified new file which causes the computing device to crash.

7. An apparatus comprising:
    a processor; and
    memory including computer program code, the memory and computer program code configured in use to, with the at least one processor, cause the apparatus to perform at least the following:
    identify any new files to be loaded in the apparatus during a boot-up process of the apparatus;
    write a representation of at least one of the identified new file in an invalid portion list on the apparatus, wherein the list comprises a valid portion and the invalid portion;
    determine if loading at least one of the identified new files causes the apparatus to crash;
    update a list on the apparatus in dependence on whether the loading of the identified new file causes the apparatus to crash, wherein in an instance in which loading the identified new file causes the apparatus to crash, the representation is maintained in the invalid potion, and wherein in an instance in which the loading the identified new file does not cause the apparatus to crash, the representation is moved to the valid portion;
    identify a default file associated with the identified new file which causes the apparatus to crash; and
    load a file from the at least one new file in the apparatus during a boot-up process of the apparatus in dependence on the list to prevent the apparatus crashing during the boot-up process;
    wherein the default file is loaded in the place of the identified new file which causes the apparatus to crash.

8. The apparatus according to claim 7, wherein the apparatus is further caused to perform, load the identified new file and detecting if the apparatus has not crashed.

9. The apparatus according to claim 7, wherein each representation written in the invalid portion is tagged, and updating the list further comprises de-tagging a representation in the invalid portion if loading the identified new file corresponding to the representation is determined to cause the apparatus to crash.

10. The apparatus according to claim 7, wherein files having a representation in the invalid portion are not loaded, and wherein files having a representation in the valid portion are loaded.

11. The apparatus according to claim 7, wherein identifying at least one new file to be loaded in the apparatus during a boot-up process of the computing device further comprises identifying files to be loaded during the boot-up process not having a representation in the list.

12. The apparatus of claim 7, wherein the default file is an old version of the identified new file which causes the apparatus to crash.

13. A computer program product comprising at least one computer-readable storage medium, the computer-readable storage medium comprising a set of instructions, which, when executed by one or more processors, cause an apparatus at least to perform:
    identify at least one new file to be loaded in a computing device during a boot-up process of the computing device;
    write a representation of at least one of the identified new file in an invalid portion of a list on the computing device, wherein the list comprises a valid portion and the invalid portion;
    determine if loading at least one of the identified new file causes the computing device to crash;
    update a list on the computing device in dependence on whether the loading of the identified new file causes the computing device to crash, wherein in an instance in which loading the identified new file causes the computing device to crash, the representation is maintained in the invalid potion, and wherein in an instance in which the loading the identified new file does not cause the computing device to crash, the representation is moved to the valid portion;
    identify a default file associated with the identified new file which causes the computing device to crash; and load a file from the at least one new file in the computing device during a boot-up process of the computing device in dependence on the list to prevent the computing device crashing during the boot-up process;

wherein the default file is loaded in the place of the identified new file which causes the computing device to crash.

14. The computer program product according to claim 13, wherein the apparatus is further caused to perform, load the identified new file and detecting if the computing device has not crashed.

15. The computer program product according to claim 13, wherein each representation written in the invalid portion is tagged, and updating the list further comprises de-tagging a representation in the invalid portion if loading the identified new file corresponding to the representation is determined to cause the computing device to crash.

16. The computer program product according to claim 13, wherein files having a representation in the invalid portion are not loaded, and wherein files having a representation in the valid portion are loaded.

17. The computer program product according to claim 13, wherein identifying at least one new file to be loaded in the computing device during a boot-up process of the computing device further comprises identifying files to be loaded during the boot-up process not having a representation in the list.

18. The computer program product of claim 13, wherein the default file is an old version of the identified new file which causes the computing device to crash.

* * * * *

UNITED STATES PATENT AND TRADEMARK OFFICE
CERTIFICATE OF CORRECTION

| | | |
|---|---|---|
| PATENT NO. | : 9,081,727 B2 | Page 1 of 1 |
| APPLICATION NO. | : 13/378355 | |
| DATED | : July 14, 2015 | |
| INVENTOR(S) | : Kren et al. | |

It is certified that error appears in the above-identified patent and that said Letters Patent is hereby corrected as shown below:

In the claims:

Column 16,
Line 2, "portion list on the apparatus" should read --portion of a list on the apparatus--.

Signed and Sealed this
Eighth Day of March, 2016

Michelle K. Lee
*Director of the United States Patent and Trademark Office*